(No Model.)

H. GROSS.
MEANS FOR CONNECTING SPINDLES TO THE WALLS OR DOORS OF SAFES.

No. 402,587. Patented May 7, 1889.

Witnesses
W. Rossiter
Fredk H. Mills

Inventor
Henry Gross
By Pierce & Fisher
His Attys.

UNITED STATES PATENT OFFICE.

HENRY GROSS, OF CHICAGO, ILLINOIS, ASSIGNOR TO THE CHICAGO SAFE AND LOCK COMPANY, OF SAME PLACE.

MEANS FOR CONNECTING SPINDLES TO THE WALLS OR DOORS OF SAFES.

SPECIFICATION forming part of Letters Patent No. 402,587, dated May 7, 1889.

Application filed June 28, 1888. Serial No. 278,404. (No model.)

*To all whom it may concern:*

Be it known that I, HENRY GROSS, a citizen of the United States, residing at Chicago, in the county of Cook and State of Illinois, have invented certain new and useful Improvements in Means for Connecting Spindles or Arbors to the Walls or Doors of Safes or Vaults, of which I do declare the following to be a full, clear, and exact description, reference being had to the accompanying drawings, forming part of this specification.

My present invention has for its object to provide means whereby the spindle or arbor can be readily and securely held within the wall of the safe against all danger of being driven in by burglars' tools, and can also be removed from the inside of the safe in case the spindle or arbor should become accidentally broken, and this, too, without the necessity of destroying the safe door or wall.

To this end my invention consists in the novel features of construction hereinafter described, illustrated in the accompanying drawings, and particularly defined in the claims at the end of this specification.

Figure 1:
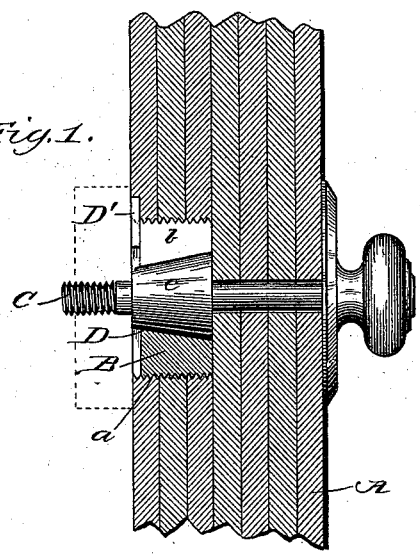
Figure 2:
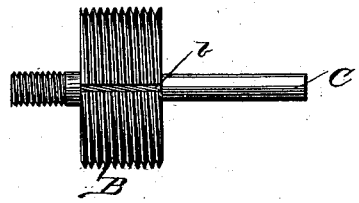
Figure 3:
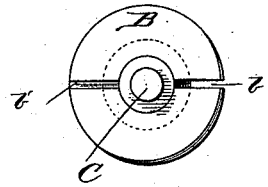

Figure 1 is a view in vertical section through the wall or door of a safe or vault having my invention applied thereto, the spindle being shown in side elevation. Fig. 2 is a detail view of the spindle and the locking nut or plug. Fig. 3 is an inner end view of the locking nut or plug and the spindle.

A designates the wall or door of the safe or vault, which is shown as formed of a series of plates, that will be bolted together in well-known manner. Within this door A, upon its inner side, is formed a seat or recess, $a$, adapted to receive a nut or plug, B, the exterior of this nut or plug and the wall of the recess being preferably screw-threaded to engage with each other and hold the nut or plug in place.

In the nut or plug B is formed a cavity, D, adapted to receive a shoulder or offset, $c$, that is formed upon the spindle C, that extends from front to back of the door or wall A. The cavity in the nut or plug B and the shoulder or offset $c$ of the spindle C are preferably of conical shape, the small diameter of the shoulder and cavity being nearest the inner face of the safe door or wall. The purpose of so shaping the shoulder or offset in the cavity D is to prevent the spindle or arbor C from being driven inward from the outside of the safe; and it is obvious that when the nut or plug has been screwed firmly to its seat it will securely hold the spindle against forcible displacement.

In order to more securely guard against all danger of the spindle or of the nut or plug being forced inward, I prefer to form the nut or plug as a split ring—that is to say, with a slot, $b$, cut from end to end thereof—so that in case attempt is made to drive in the spindle or arbor the pressure of the conical shoulder or offset against the conical wall of the nut or plug will tend to expand this nut or plug and cause its periphery to more securely engage with the threaded walls of the recess $a$.

In order to permit the nut or plug B to be properly seated, I prefer to provide a slot or depression, $b'$, upon its inner end opposite the slot $b$, so that a screw-driver may be used in setting the nut or plug within the seat, and when the nut or plug has been thus properly set a depression may be made in the wall of the safe adjacent either the slots $b$ and $b'$ to receive a key for securely preventing the turning of the nut from the outside of the safe.

I prefer to form the portion of the spindle or arbor C that extends outward from the shoulder or offset $c$ of small diameter, for the reason that it can be thereby more readily tempered to a very high degree, and for the further reason that in case it should be broken by a burglar the cavity through which it passes would be too small to permit the introduction of a drill or punch of any considerable size. Upon the inner end of the spindle or arbor C may be attached any suitable means for operating the bolt-work or lock mechanism upon the inner side of the door, the inner end of the arbor or spindle being shown as screw-threaded to receive a driving-wheel in the ordinary manner.

From the foregoing construction it will be seen that in preparing the door or wall of the safe or vault to receive the spindle or arbor it is not necessary to provide conical cavities, as heretofore the practice; but it is simply necessary to provide straight cavities that can be cheaply and readily formed to receive the reduced outer portion of the spindle and to receive the nut or plug B; and it is apparent, also, that in case the spindle or arbor should be broken it can be readily replaced by merely withdrawing the key D' and unscrewing the nut or plug from the seat.

A further advantage incident to the employment of my invention is that the nut as it is screwed into the seat can be adjusted snugly against the periphery of the conical shoulder c of the arbor, so that all danger is avoided of leaving such space between the two as would permit the introduction of an explosive, and yet the danger of any binding of the parts is also overcome.

While I have described what I regard as the preferred embodiment of my invention, it will be readily understood that the precise details of construction above set out may be varied by the skilled mechanic without departing from the spirit of the invention. Thus, for example, it will be within the scope of the invention to modify the shape of the shoulder or offset c of the spindle or arbor and to modify the form of the expansible nut or plug C. To such details, therefore, I do not wish my invention to be understood as restricted.

Having thus described my invention, what I claim as new, and desire to secure by Letters Patent, is—

1. The combination, with the door or wall of a safe or vault, of a spindle provided with a shoulder or offset and a recessed nut or plug formed with a slot or cut-away space, whereby said nut or plug is rendered expansible, substantially as described.

2. The combination, with the door or wall of a safe or vault, of a spindle provided with a conical shoulder and a nut or plug provided with a conical recess, said nut or plug being split to permit it to expand by the action of forcing inward the spindle, substantially as described.

HENRY GROSS.

Witnesses:
   GEO. P. FISHER, Jr.,
   T. B. CARPENTER.